(12) United States Patent
Bai et al.

(10) Patent No.: US 8,792,729 B2
(45) Date of Patent: Jul. 29, 2014

(54) IMAGE PROCESSING APPARATUS AND METHOD

(75) Inventors: Lu Bai, Beijing (CN); Jun Wan, Beijing (CN); Jing Dai, Beijing (CN); Shaobin Wang, Beijing (CN); Jim Piper, Edinburgh (GB); Costas Plakas, Edinburgh (GB)

(73) Assignees: Kabushiki Kaisha Toshiba, Minato-Ku, Tokyo (JP); Toshiba Medical Systems Corporation, Otawara-Shi, Tochigi (JP)

( * ) Notice: Subject to any disclaimer, the term of this patent is extended or adjusted under 35 U.S.C. 154(b) by 0 days.

(21) Appl. No.: 13/537,701

(22) Filed: Jun. 29, 2012

(65) Prior Publication Data

US 2013/0004085 A1 Jan. 3, 2013

(30) Foreign Application Priority Data

Jul. 1, 2011 (CN) .......................... 2011 1 0192743

(51) Int. Cl.
*G06K 9/62* (2006.01)

(52) U.S. Cl.
USPC ............................ 382/209; 382/284; 382/294

(58) Field of Classification Search
USPC ............. 378/41, 62, 174; 382/128, 132, 209, 382/256, 274, 284
See application file for complete search history.

(56) References Cited

U.S. PATENT DOCUMENTS

| | | | | |
|---|---|---|---|---|
| 6,793,390 | B2 * | 9/2004 | Wang et al. | 378/174 |
| 7,127,090 | B2 * | 10/2006 | Kreang-Arekul et al. | 382/128 |
| 7,256,799 | B2 * | 8/2007 | Hatanaka et al. | 345/629 |
| 7,298,923 | B2 | 11/2007 | Zhang et al. | |
| 7,502,503 | B2 * | 3/2009 | Bojer et al. | 382/132 |
| 7,650,044 | B2 * | 1/2010 | Kreang-Arekul et al. | 382/274 |
| 2010/0014780 | A1 * | 1/2010 | Kalayeh | 382/284 |
| 2010/0067762 | A1 | 3/2010 | Glocker et al. | |
| 2010/0194851 | A1 * | 8/2010 | Pasupaleti et al. | 348/36 |
| 2011/0188726 | A1 * | 8/2011 | Nathaniel et al. | 382/132 |
| 2013/0004085 | A1 * | 1/2013 | Bai et al. | 382/209 |

FOREIGN PATENT DOCUMENTS

| | | |
|---|---|---|
| JP | 2003-126071 | 7/2003 |
| JP | 2006-139782 | 6/2006 |

* cited by examiner

*Primary Examiner* — Gregory M Desire
(74) *Attorney, Agent, or Firm* — Nixon & Vanderhye PC (57) ABSTRACT

An image processing apparatus may include: a first registration device for performing, by taking a first input image of two overlapped input images having an overlapped area as a reference image, a first registration on a second input image to find, in the second input image, a second pixel which is matched with each first pixel located in the overlapped area of the reference image; an output pixel location determination device for calculating a location of an output pixel which is located in the overlapped area of the output image and corresponds to the first pixel, the locations of the first and second pixels being respectively weighted, and the shorter the distance from the first pixel to a non-overlapped area of the reference image is, the greater a weight of the location of the first pixel is; and an output pixel value determination device for calculating a pixel value.

11 Claims, 5 Drawing Sheets

IMAGE PROCESSING APPARATUS AND METHOD

CROSS-REFERENCE TO RELATED APPLICATIONS

This application is based upon and claims the benefit of priority from Chinese Patent Application No. 201110192743.X, filed on Jul. 1, 2011, the entire contents of which are incorporated herein by reference.

FIELD

The disclosure relates to the field of image processing and, in particular, to an image processing apparatus and method capable of stitching two overlapped images (e.g. medical images).

BACKGROUND

Image stitching, as an important subject in the image processing field, has a promising application prospect. For instance, during medical image processing, due to limitation in the size of a medical imaging apparatus, it is sometimes hard to image an object completely at one time. For instance, when using a nuclear magnetic resonance imaging apparatus to scan the spine of a patient, only part of the spine of the patient can be imaged at each scanning. In this case, the images obtained from multiple times of scanning should be stitched to obtain an image of the whole spine.

DETAILED DESCRIPTION

The following presents a simplified summary of the disclosure to provide a basic understanding of the disclosure. The summary is not intended to identify the key or critical parts of the disclosure or limit the scope of the disclosure, but merely to present some concepts in a simplified form as a prelude to the more detailed description that is discussed later.

In accordance with an aspect of the disclosure, there is provided an image processing apparatus capable of stitching two overlapped input images having an overlapped area into an output image. The image processing apparatus may include: a first registration device for performing, by taking a first input image of the two overlapped input images as a reference image, a first registration on a second input image of the two overlapped input images, to find, in the second input image, a second pixel which is matched with each first pixel located in the overlapped area of the reference image; an output pixel location determination device for calculating, based on the locations of the first and second pixels, a location of an output pixel which is located in the overlapped area of the output image and corresponds to the first pixel, wherein the locations of the first and second pixels are respectively weighted, and the shorter the distance from the first pixel to a non-overlapped area of the reference image is, the greater a weight of the location of the first pixel is, and the smaller a weight of the location of the second pixel is; and an output pixel value determination device for calculating a pixel value of the output pixel according to a pixel value of at least one of the first and second pixels.

In accordance with an aspect of the disclosure, there is provided an image processing method for stitching two overlapped input images having an overlapped area into an output image. The image processing method may include: performing, by taking a first input image of the two overlapped input images as a reference image, a first registration on a second input image of the two overlapped input images, to find, in the second input image, a second pixel which is matched with each first pixel located in the overlapped area of the reference image; calculating, based on the locations of the first and second pixels, a location of an output pixel which is located in the overlapped area of the output image and corresponds to the first pixel, wherein the locations of the first and second pixels are respectively weighted, and the shorter the distance from the first pixel to a non-overlapped area of the reference image is, the greater a weight of the location of the first pixel is, and the smaller a weight of the location of the second pixel is; and calculating a pixel value of the output pixel according to a pixel value of at least one of the first and second pixels.

Moreover, a computer program for realizing the foregoing method is also provided in an embodiment of the disclosure.

Additionally, a computer program product in a form at least readable to the computer is further provided in an embodiment of this disclosure, wherein computer program codes for realizing the foregoing method are recorded on the computer program product.

The foregoing and other objects, features and advantages of this disclosure will be better understood with reference to the following description taken in conjunction with accompanying drawings in which components are merely illustrative of the principle of this disclosure, and identical or like technical features or components are represented with identical or like reference signs.

Embodiments of the disclosure are described below with reference to accompanying drawings. In this disclosure, the elements and features described in an accompanying drawing or implementation mode may be combined with those described in one or more other accompanying drawings or implementation modes. It should be noted that for the sake of clarity, the components and processing that are unrelated to the disclosure and well known to those of ordinary skill in the art are not represented or described.

An image processing apparatus and method for stitching two or more overlapped images are provided in some embodiments of the disclosure.

It should be appreciated that the apparatus and method provided in embodiments of the disclosure are capable of stitching various types of images, for example, medical images. The medical image here may refer to an image formed by the data on an examinee obtained by a medical diagnosis imaging device, which includes, but is not limited to: an X-ray imaging diagnostic device, an ultrasonic diagnostic imaging device, a computed tomography (CT) device, a magnetic resonance imaging (MRI) diagnostic device, a positron emission tomography (PET) device and the like. Specifically, the input images stitched by the apparatus and method provided in the embodiments of the disclosure may be overlapped medical images that are obtained by scanning different portions of the same body part with a medical imaging apparatus, for example, overlapped nuclear magnetic resonance images obtained by scanning different parts of the spine of a patient with a nuclear magnetic resonance imaging apparatus and other images that are not listed here.

Furthermore, for the sake of simplicity, the following description takes the stitching of two overlapped input images as an example. However, it should be appreciated that the method and apparatus of the disclosure are capable of stitching more than two overlapped input images.

Figure 1:
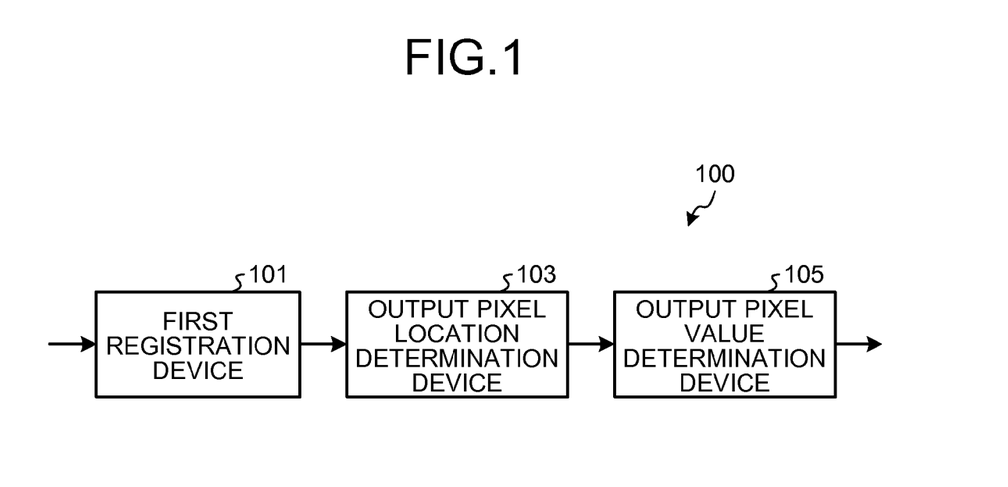
FIG. 1 is a schematic block diagram illustrating the structure of an image processing apparatus according to an embodiment of the disclosure.
Figure 2:
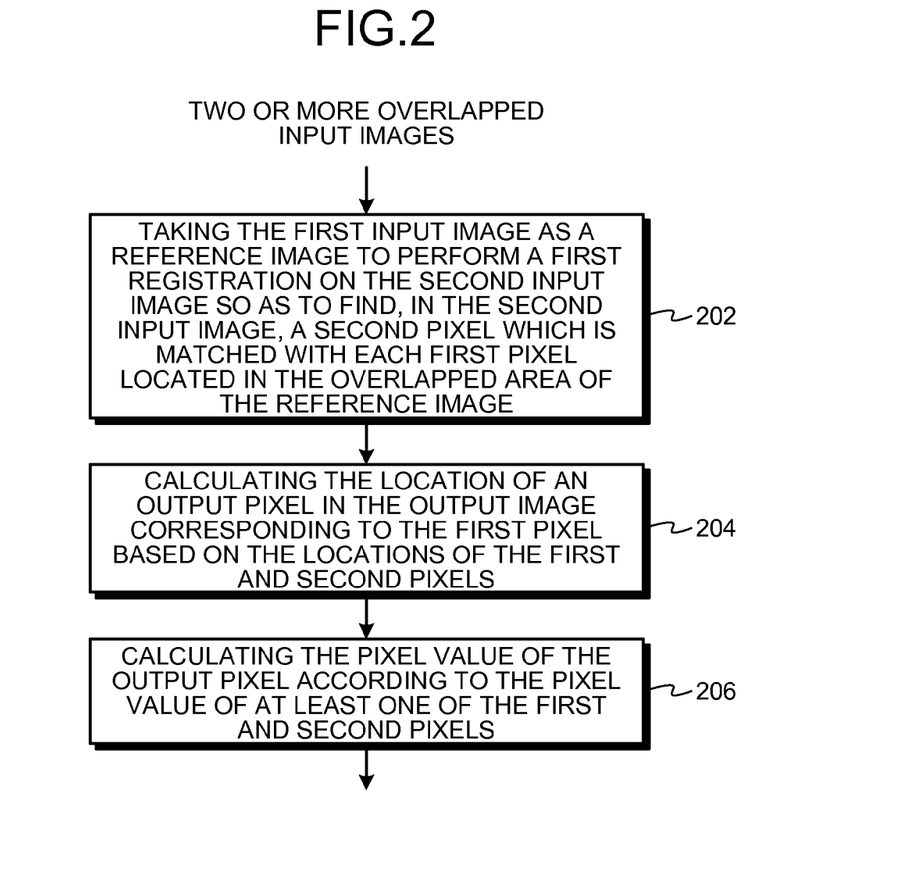
FIG. 2 is a schematic flow chart of an image processing method according to the embodiment of FIG. 1.

FIG. 1 is schematic block diagram illustrating the structure of an image processing apparatus according to an embodiment of the disclosure, and FIG. 2 is a schematic flow chart of an image processing method according to the embodiment of FIG. 1.

When two overlapped input images are stitched, the non-overlapped areas of the two input images are respectively mapped to corresponding parts of the output image obtained from the stitching. For instance, assuming that one of the two input images is represented by iR, the other one is represented by iF, and the overlapped area of the two input images is represented by iO, then the output image iS obtained from stitching the two input images may be represented by the following formula:

$$iS(\vec{Y}) = \begin{cases} iR(\vec{Y}) & \vec{Y} \in iR, \text{ and } \vec{Y} \notin iO \\ iF(\vec{Y}) & \vec{Y} \in iF, \text{ and } \vec{Y} \notin iO \\ \text{padding} & \vec{Y} \in iS, \text{ and } \vec{Y} \notin iR, \vec{Y} \notin iF, \end{cases} \quad (1)$$

wherein $\vec{Y}$ represents the location of a pixel in the output image. $\vec{Y}$ is a two-dimensional vector when the output image is a two-dimensional image and is a three-dimensional vector when the output image is a three-dimensional image; $iS(\vec{Y})$ represents the pixel value of the pixel $\vec{Y}$ in the output image, and $iR(\vec{Y})$ and $iF(\vec{Y})$ respectively represent the pixel values of the pixels at corresponding locations of the input images iR and iF. That is, the pixels in the non-overlapped areas of the two input images (the pixels of the two input images not belonging to the overlapped area) may be directly mapped to pixels in two corresponding non-overlapped areas of the output image. The pixels (that is, the 'padding' shown in formula (1)) in the area between two non-overlapped areas of the output image (the area corresponding to the overlapped area) may be determined using the apparatus or method shown in FIG. 1 and FIG. 2 according to the pixels of the two input images located in the overlapped area iO.

As shown in FIG. 1, the image processing apparatus 100 may include a first registration device 101, an output pixel location determination device 103 and an output pixel value determination device 105. The image processing apparatus 100 may perform an image stitching using the method shown in FIG. 2. The function of each device in the image processing apparatus 100 is described below with reference to the flow of the method shown in FIG. 2.

Figure 9:
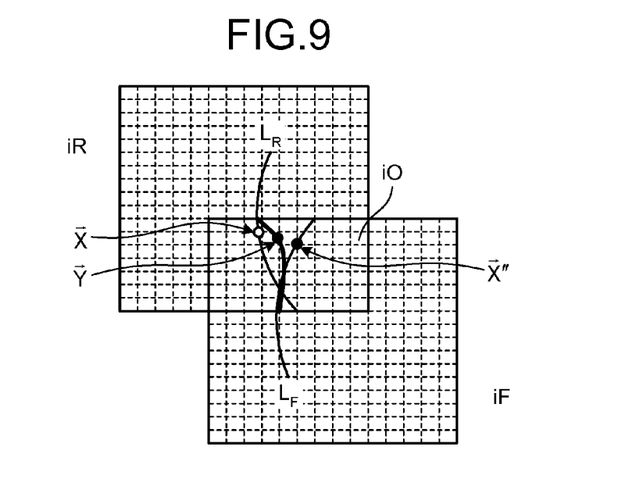

The first registration device 101 is used for performing a registration on two overlapped input images (Step 202) to match the pixels of the two input images located in the overlapped area. A certain transformation may exist in the two input images sometimes. For instance, in the case where the two input images are two overlapped MRI images obtained by scanning the spine of a person with an MRI device, due to the inherent deficiency of the MRI device, the overlapped parts of the two obtained images are not exactly matched with each other. FIG. 9 schematically shows two overlapped images iR and iF, wherein $L_R$ and $L_F$ represent the imaging results with respect to the same line in iR and iF, it can be seen from the result that the two images are both transformed and cannot be matched. The first registration device is configured to obtain the transformation information of the two images using an image registration method.

Specifically, as shown in step 202, by taking one of the two input images as a reference image (also referred to as a first input image herein), a registration (also referred to as a first registration herein) is performed on the other input image (also referred to as a second input image herein) to find pixels (the pixels in the second input image are herein referred to as second pixels) in the second input image which are matched with the pixels (the pixels in the first input image are herein referred to as first pixels) of the first input image located in the overlapped area of the two images.

As an example, the first registration may be performed using a non-rigid registration method. Any appropriate non-rigid registration method, for example, a registration describing a transformation domain based on a basic function, the registration of a thin plate spline or B-spline, registration based on physical modules of elastic transformation or registration based on an optical flow field and other registration methods that are not listed herein, may be adopted to perform the first registration, as long as a second pixel may be found in the second input image which is matched with the first pixel of the first image located in the overlapped area of the two images. As another example, the first registration may be performed using any appropriate rigid registration method that is not described herein in detail.

It should be noted that any one of the two input images can be selected as the reference image (that is, the first input image) and the other one as the second input image.

By taking the two images shown in FIG. 9 as an example, assuming that the image iR is taken as a reference image to perform the first registration shown in step 202 on the other image iF and $\vec{X}$ represents a pixel in iR in an overlapped area iO (a first pixel), then a pixel $\vec{X}''$ (a second pixel) can be found in the image iF which is matched with the pixel $\vec{X}$ after the a first registration is performed on the image iF by taking the image iR as a reference image.

After finding the second pixel that is matched with the first pixel of the first input image located in the overlapped area, the first registration device 101 outputs the locations and the pixel values of the matched first and second pixels to the output pixel location determination device 103 and the output pixel value determination device 105 respectively. And based on the locations and the pixel values of the matched first and second pixels located in the overlapped area of the two input images, the output pixel location determination device 103 and the output pixel value determination device 105 respectively determine the locations and the pixel values of the pixels in the output image that correspond to the matched first and second pixels.

Specifically, as shown in step 204, the output pixel location determination device 103 is used for calculating, based on the location of the first pixel located in the overlapped area of the reference image and the location of the second pixel matched with the first pixel, the location of an output pixel which is located in the overlapped area of the output image and corresponds to the first pixel. The shorter the distance from the first pixel to the non-overlapped area of the reference image is, the greater the weight of the location of the first pixel is, and the smaller the weight of the location of the second pixel is, and on the contrary. The longer the distance from the first pixel to the non-overlapped area of the reference image is, the smaller the weight of the location of the first pixel is, and the greater the weight of the location of the second pixel is.

As an example, the weight of the location of the first pixel is in a nonlinear function relation with the shortest distance from the first pixel to the non-overlapped area of the reference image.

Still taking the two images shown in FIG. 9 as an example, the output pixel $\vec{Y}$ in the output image corresponding to the first pixel $\vec{X}$ may be represented by the following formula:

$$\vec{Y} = (1-b(\vec{Y}))\vec{X} + b(\vec{X})\vec{X}'' \tag{2}$$

In formula (2), $(1-b(\vec{X}))$ represents the weight of the location $\vec{X}$ of the first pixel, and $b(\vec{X})$ represents the weight of the location $\vec{X}''$ of the second pixel, wherein the weights are in a nonlinear function relation with the shortest distance from the first pixel to the non-overlapped area of the reference image iR. As shown in FIG. 9, a transformation exists between the input images iR and iF, that is, the pixels in the two images that correspond to each other are not in a linear relation. As a consequence, the area in the output image corresponding to the overlapped area iO cannot be transited smoothly to the two non-overlapped areas if the weights are set to be in a linear function relation with the shortest distance from the first pixel to the non-overlapped area of the reference image iR. In this embodiment, as the weights are set to be in a nonlinear function relation with the shortest distance from the first pixel to the non-overlapped area of the reference image iR, the transition between the overlapped area and the non-overlapped areas in the output image obtained from stitching may be smooth.

As shown in step 206, the output pixel value determination device 105 is used for calculating, based on the pixel value of the first pixel in the reference image and/or the pixel value of the second pixel matched with the first pixel, the pixel value of an output pixel which is located in the overlapped area of the output image and corresponds to the first pixel. The output pixel value determination device 105 may determine the pixel value of each output pixel that is located in the output image and corresponds to each first pixel (and the second pixel matched with the first pixel) in the overlapped area of the input images by using the method that is described below with reference to FIG. 4 or any other appropriate method.

By using the apparatus or method shown in FIG. 1 or FIG. 2, two overlapped input images can be stitched, and a smooth transition can be achieved between the overlapped area and the non-overlapped areas in the stitched image. Besides, by using the apparatus or method shown in FIG. 1 or FIG. 2, a registration is only performed on one of the two input images by taking the other one as a reference image, thus reducing the amount of the calculation in image stitching. In addition, only a first registration is performed on the overlapped area of the two input images once, thus further reducing the amount of calculation in image stitching.

Figure 3:
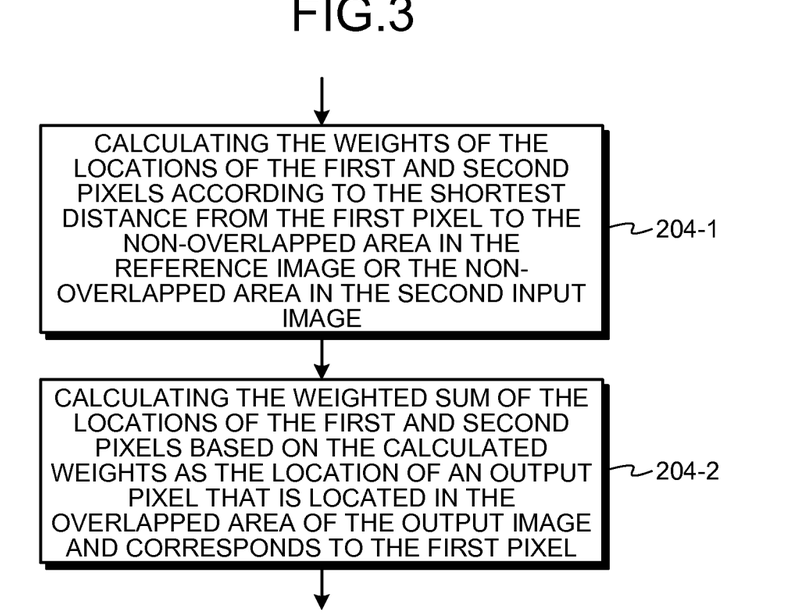
FIG. 3 is a schematic flow chart of a method for determining the location of an output pixel in an output image according to a specific embodiment of the disclosure.

As a specific embodiment, the output pixel location determination unit 103 may adopt the method shown in FIG. 3 to determine the location of an output pixel in the output image that corresponds to the first pixel.

As shown in FIG. 3, the step 204 shown in FIG. 2 may include steps 204-1 and 204-2. The weights of the locations of the first and second pixels are calculated in step 204-1 according to the shortest distance from the first pixel to the non-overlapped area in the reference image or the non-overlapped area in the second input image.

As an example, the shorter the distance from the first pixel to the non-overlapped area in the reference image or the non-overlapped area in the second input image is, the smaller the variation gradient of the weights of the locations of the first and second pixels is. By using this method, the transition between the overlapped area and the two non-overlapped areas in the output image obtained from the stitching is smoothed.

As a specific example, still taking the images shown in FIG. 9 as an example, the weight $b(\vec{X})$ of the location of the second pixel is calculated according to the following formula, and $(1-b(\vec{X}))$ is taken as the weight of the location of the first pixel, $$b(\vec{X}) = \alpha \cdot \left\{ 1 - \cos\left[\frac{dR(\vec{X}) \cdot \pi}{dR(\vec{X}) + dF(\vec{X})}\right] \right\} \tag{3}$$

wherein $\alpha$ represents a constant, $dR(\vec{X})$ represents the shortest distance from the first pixel $\vec{X}$ to the non-overlapped area of the reference image iR, and $dF(\vec{X})$ represents the shortest distance from the first pixel to the non-overlapped area of the second input image iR. By using the method shown in formula (3), the transition between the overlapped area and the two non-overlapped areas of the output image obtained from the stitching is further smoothed.

The value of the constant $\alpha$ shown in formula (3) is determined depending on actual application scenarios and is thus not defined herein. In an example, $0 \leq \alpha \leq 1$. Preferably the constant $\alpha$ may be equal to 0.5.

As another specific example, the foregoing weights may be calculated using a formula different from formula (3) (e.g. a mathematical transformation of formula (3)). For instance, the cosine function of formula (3) may be replaced with a Sigmoid function and other appropriate S-type functions as long as the following condition is met: the variation gradient of the calculated weights $b\vec{X}$ and $(1-b(\vec{X}))$ drops with the shortest distance from the first pixel to the non-overlapped area of the reference image or the non-overlapped area of the second input image.

Then, in step 204-2, the weighted sum of the locations of the first and second pixels is calculated based on the weights obtained in step 204-1, as the location of an output pixel that is located in the overlapped area of the output image and corresponds to the first pixel. The foregoing formula (2) may be represented as follows:

$$\vec{Y} = \vec{X} + b(\vec{X})W(\vec{X}) \tag{4}$$

wherein $W(\vec{X})=\vec{X}^n-\vec{X}$, and $W(\vec{X})$ is a vector representing the displacement relation of the matched first and second pixels $\vec{X}$ and $\vec{X}^n$.

Figure 4:
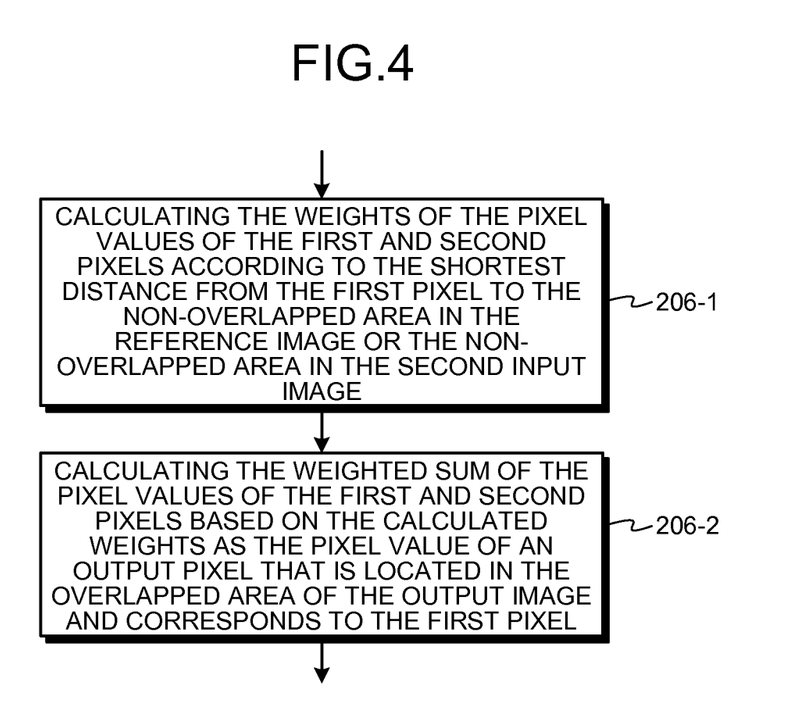
FIG. 4 is a schematic flow chart of a method for determining the pixel value of an output pixel in an output image according to a specific embodiment of the disclosure.

As a specific embodiment, the output pixel value determination unit 105 may adopt the method shown in FIG. 4 to determine the pixel value of an output pixel that is located in the output image and corresponds to the first pixel.

As shown in FIG. 4, the step 206 shown in FIG. 2 may include steps 206-1 and 206-2.

The weights of the pixel values of the first and second pixels are calculated in step 206-1 according to the shortest distance from the output pixel obtained in step 204 to the non-overlapped area in the reference image or the non-overlapped area in the second input image.

As an example, the weights of the pixel values of the first and second pixels may be determined using any appropriate method, depending on the actual application scenarios. For instance, the weight of the pixel value of the first pixel may be any value that is ranged from 0 and 1, and the sum of the weights of the pixel values of the first and second pixels is equal to 1.

As another example, the weights of the pixel values of the first and second pixels may be determined according to the distance between the output pixel and the non-overlapped area of the reference image. For instance, the shorter the distance between the output pixel and the non-overlapped area of the reference image is, the greater the weight of the pixel value of the first pixel is, and the shorter the distance between the output pixel and the non-overlapped area of the second input image is, the greater the weight of the pixel value of the second pixel is. By using this method, the transition between the overlapped area and the two non-overlapped areas of the output image is smoothed.

As a specific example, the weights of the pixel values of the first and second pixels are in a nonlinear function relation with the shortest distance between the output pixel and the non-overlapped area of the reference image, wherein the shorter the distance from the output pixel to the non-overlapped area of the reference image or the non-overlapped area of the second input image is, the smaller the variation gradient of the weights of the pixel values of the first and second pixels is. By using the method of this specific example, the transition between the overlapped area and the two non-overlapped areas of the output image is smoothed.

As a specific example, still taking the images shown in FIG. 9 as an example, the weight ($b(\vec{Y})$) of the pixel value of the second pixel $\vec{X}^n$ is calculated according to the following formula, and $1-b(\vec{Y}))$ is taken as the weight of the pixel value of the first pixel $\vec{X}$, $$b(\vec{Y}) = b \cdot \left\{ 1 - \cos\left[\frac{dR(\vec{Y}) \cdot \pi}{dR(\vec{Y}) + dF(\vec{Y})}\right] \right\} \quad (5)$$

wherein b represents a constant, $dR(\vec{Y})$ represents the shortest distance between an output pixel at the location $\vec{Y}$ and the non-overlapped area of the reference image, and $dF(\vec{Y})$ represents the shortest distance between the output pixel at the location $\vec{Y}$ and the non-overlapped area of the second input image. By using the method of this specific example, the transition between pixel values of the overlapped area and the two non-overlapped areas of the output image is smoothed.

The value of the constant b shown in formula (5) is determined depending on an actual application scene and is thus not limited here. In an example, $0 \leq b \leq 1$. Preferably b may be equal to 0.5.

As another specific example, the foregoing weights may be calculated using a formula different from formula (5) (e.g. a mathematical transformation of formula (5)). For instance, the cosine function of formula (5) may be replaced with a Sigmoid function and other appropriate S-type functions, as long as the following condition is met: the variation gradient of the calculated weights ($b(\vec{Y})$ and $1-b(\vec{Y})$) drops with the shortest distance from the output pixel to the non-overlapped area of the reference image or the non-overlapped area of the second input image.

Then, in step 206-2, the weighted sum of the pixel values of the first and second pixels is calculated based on the weights calculated in step 206-1, as the pixel value of the output pixel. For instance, the pixel value of the output pixel may be calculated using the following formula:

$$iS(\vec{Y})=iR(\vec{X}) \cdot [1-b(\vec{Y})]+iF(\vec{X}+\vec{W}(\vec{X})) \cdot b(\vec{Y}) \quad (6),$$

wherein iS(Y) represents the pixel value of an output pixel Y in the output image, and $iR(\vec{X})$ and $iF(\vec{X}+W(\vec{Y}))$ respectively represent the pixel values of the pixels at corresponding locations of the input images iR and iF (that is, the pixel values of the first pixel $\vec{X}$ and the second pixel $\vec{X}^n$).

Figure 5:
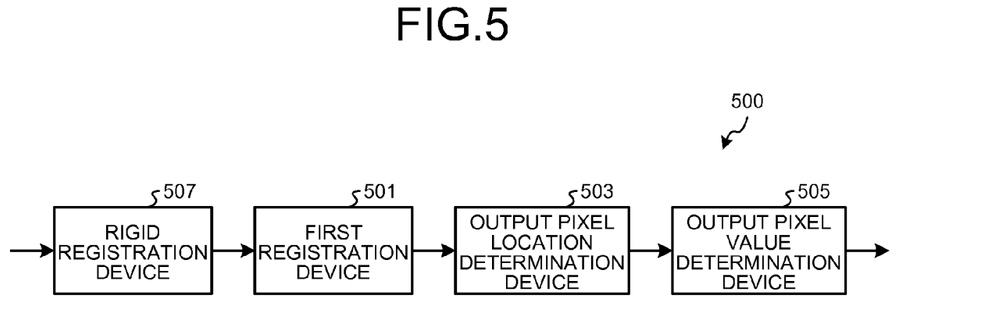
FIG. 5 is a schematic block diagram illustrating the structure of an image processing apparatus according to another embodiment of the disclosure.
Figure 6:
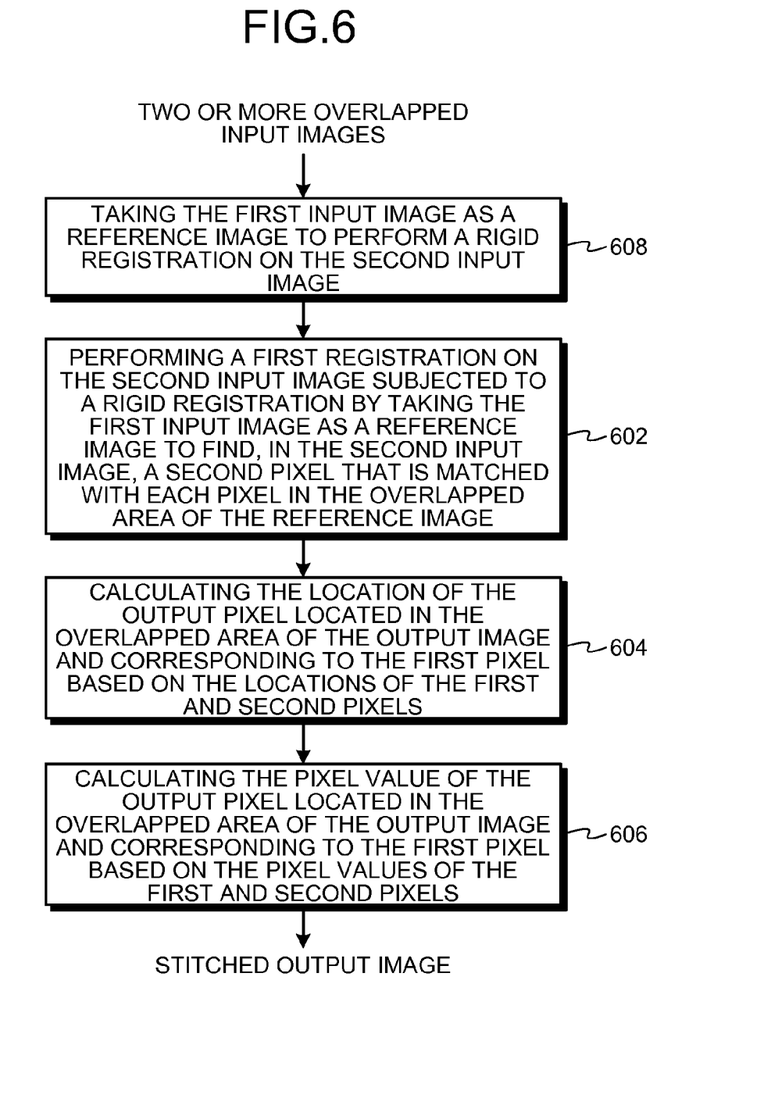
FIG. 6 is a schematic flow chart of an image processing method according to another embodiment of the disclosure.

FIG. 5 is schematic block diagram illustrating the structure of an image processing apparatus according to another embodiment of the disclosure, and FIG. 6 is a schematic flow chart of an image processing method according to the embodiment of FIG. 5.

The embodiment shown in FIG. 5 or FIG. 6, which is similar to the foregoing embodiment/example described with reference to FIG. 1-FIG. 4, is however different in that the image processing apparatus 500 shown in FIG. 5 further includes a rigid registration device 507 in addition to the first registration device 501, the output pixel location determination device 503 and the output pixel value determination device 505, and that the image processing method shown in FIG. 6 further includes a step 608 of performing a rigid registration on the two input images in addition to the steps 602, 604 and 606.

The image processing apparatus 500 may perform an image stitching using the method shown in FIG. 6. The function of each device in the image processing apparatus 500 is described below with reference to the flow of the method shown in FIG. 6.

The rigid registration device 507 may perform a rigid registration on the two input images using the method illustrated in step 608. Specifically, in step 608, either of the two input images is selected as a reference image (also referred to as a first input image) to perform a rigid registration on the other one (also referred to as a second input image). Any appropriate rigid registration method can be adopted, such as a point-based registration method, a division-based registration method or a registration method based on primitive features. The similarity measurement involved in the rigid registration may be realized by a method based on mutual information and normalized mutual information combined with column diagram or methods based on mean square difference, correlation coefficient or gradient similarity. The optimization method used in the rigid registration may be Powell search, Pseudo-Exhaustive and other optimization methods that are not listed here.

Figure 7:
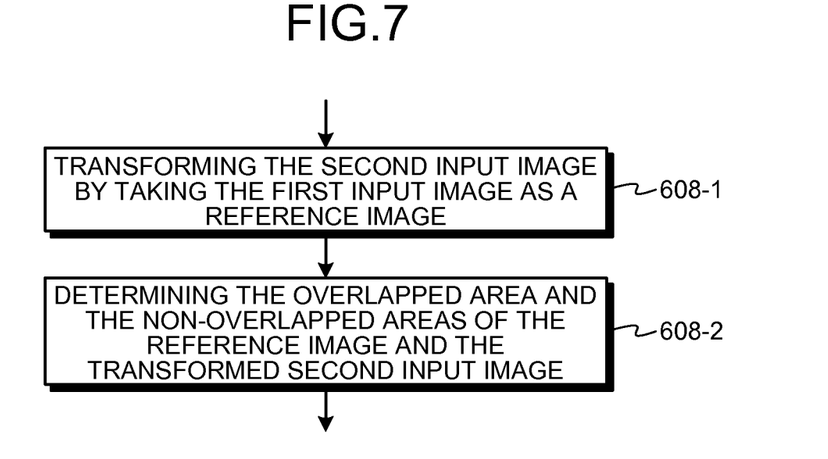
FIG. 7 is a schematic flow chart of a method for performing a rigid registration on two images according to a specific embodiment of the disclosure.

FIG. 7 shows an example of a method for performing a rigid transformation on the two images. As shown in FIG. 7, the rigid registration step 608 may include steps 608-1 and 608-2.

In step 608-1, a matrix M for representing the rotation and scale transformation relation between the two input images and a vector $\vec{T}$ for representing the displacement transformation relation of the two input images are estimated first. For instance, a pixel $\vec{T}'$ (a second pixel) in the second input image corresponding to a pixel $\vec{X}$ (a first pixel) in the reference image may be represented by the following formula:

$$\vec{X}' = M\vec{X} + \vec{T} \quad (7)$$

Figure 8:
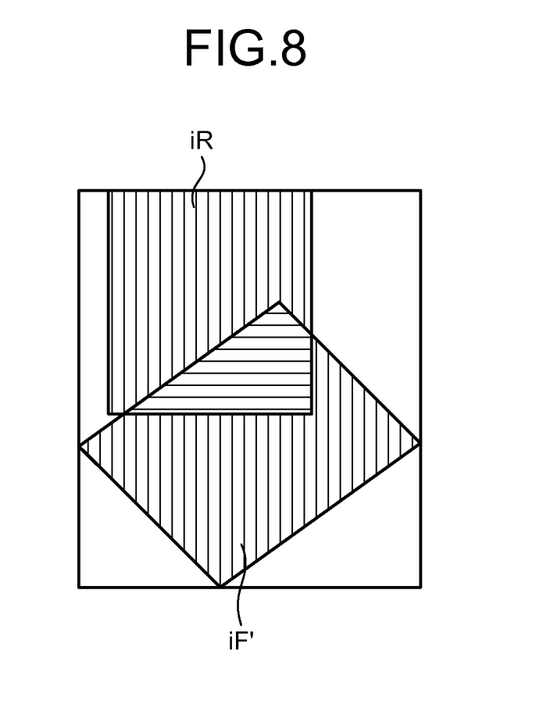
FIG. 8 and FIG. 9 schematically show two overlapped images, respectively.

Then, the second input image is transformed according to the following formula using the estimated matrix M and vector $\vec{T}$:

$$iF'(\vec{X}) = iF(\vec{X}), \text{ wherein } \vec{X} =_M \vec{X} + \vec{T} \quad (8),$$

wherein iF represents the second input image, and iF' represents an image obtained from the rigid transformation that is performed on the second input image iF by taking the first input image (the image iR shown in FIG. 8) as a reference image. Taking the images shown in FIG. 8 as an example, iR represents the reference image in the two input images, and iF' represents the second input image obtained from the rigid transformation that is performed by taking the image iR as a reference image.

The overlapped area and the non-overlapped areas of the reference image and the second input image subjected to the rigid transformation are determined in step 608-2. For instance, the non-overlapped areas in the two input images may be directly mapped to the corresponding parts in the output image (as shown in formula (1)), and the overlapped area of the two input images is processed in the following steps 602, 604 and 608 to obtain an area in the output image corresponding to the overlapped area so as to obtain the whole stitched image.

The rigid registration device 507 outputs the second input image subjected to the rigid registration to the first registration device 501. The first registration device 501 still takes the first input image as a reference image to perform a first registration (step 602) on the second input image subjected to the rigid registration to find, in the second input image subjected to the rigid registration, a pixel (referred to as second pixel) that is matched with each pixel (referred to as a first pixel) of the reference image located in the overlapped area of the two input images. The first registration device 501, the output pixel location determination device 503 and the output pixel value determination device 505 are similar in both function and structure to the devices 101, 103 and 105 illustrated in the embodiment/example described with reference to FIG. 1-FIG. 4, so no more repeated description is given here. Steps 602, 604 and 606 are also similar to the steps 202, 204 and 206 illustrated in the embodiment/example described with reference to FIG. 2-FIG. 4, so no more repeated description is given here either.

By using the apparatus or method shown in FIG. 5 or FIG. 6, two overlapped input images can be stitched, and a smooth transition may be achieved between the overlapped area and the non-overlapped areas of the stitched image. Compared with the apparatus or method shown in FIG. 1 or FIG. 2, due to the addition of the rigid registration step, the apparatus or method shown in FIG. 5 or FIG. 6 is further capable of optimizing the stitched image, thus decreasing the errors caused by the rotation, the scaling or the translation of the input images. Besides, by using the apparatus or method shown in FIG. 5 or FIG. 6, the rigid registration and the first registration are only performed on one of the two input images by taking the other one as a reference image, thus reducing the amount of the calculation for the image stitching. In addition, the first registration is only performed on the overlapped area of the two input images once, thus further reducing the amount of the calculation for the image stitching.

In another embodiment, the stitched image obtained in the above-described embodiment/example may be further processed. For instance, the image processing apparatus 100 or 500 may further include an output processing unit (not shown) which is capable of re-sampling the area of the output image that is obtained by the output pixel value determination device 105 or 505 and corresponds to the overlapped area iO. In the case that the output pixel location determination device 103 or 503 and the output pixel value determination device 105 or 505 may not maintain the same pixel space during the processing, there is a need to resample the area of the obtained output image corresponds to the overlapped area iO so as to combine the area corresponding to the overlapped area iO with the non-overlapped areas to form a complete stitched image. Similarly, the method shown in FIG. 2, FIG. 4 and FIG. 6 may further include a step of re-sampling the area that is located in the output image obtained in step 206 or 606 and corresponding to the overlapped area iO (not shown). The re-sampling may be performed using any appropriate method, which is not described and limited herein.

The pixel illustrated in the embodiments/examples of the disclosure may be a pixel in a two-dimensional image or a voxel in a three-dimensional image. The pixel value illustrated in the embodiments/examples of the disclosure may be a gray value or chromatic value representing the intensity of a pixel in an image.

The apparatus and method provided in the embodiments of the disclosure are capable of stitching various types of images, such as uni-dimensional or multi-dimensional (two-dimensional or three-dimensional) images. For instance, the image processing method or apparatus provided in the embodiments of the disclosure may be applied to performing an image stitching on medical images (for example, an image formed by the data obtained by a medical diagnostic apparatus). As an example, each step of the above-describe method and each module and/or unit of the above-described apparatus may be implemented as software, firmware, hardware of a medical diagnostic apparatus (e.g. an X-ray diagnostic device, a UL diagnostic device, a CT device, an MRI diagnostic device and/or a PET device) or a combination thereof and serve as one part of the medical diagnostic apparatus. As an example, the above-described method and/or apparatus may be implemented in an existing medical diagnostic device after making some modifications on the components of the existing medical diagnostic device. As another example, each step of the above-described method and each module and/or unit of the above-described apparatus may be implemented as an apparatus independent from the above-described medical diagnostic apparatus. Each module and unit in the foregoing apparatus can be configured through software, firmware, hardware or any combination thereof in a way (or by a means) that is well known to those skilled in the art and is therefore not repeatedly described here.

As an example, each step of the above-described method and each module and/or unit of the above-described apparatus may be implemented as software, firmware, hardware or any combination thereof. In the case where each step of the above-described method and each module and/or unit of the above-described apparatus are achieved through software or firmware, a program forming software for realizing the above-described method is installed in a computer with a specific hardware structure (e.g. the general computer 1000 shown in FIG. 10) from a storage medium or network, and the computer, when installed with a program, is capable of executing the functions of the program.

Figure 10:
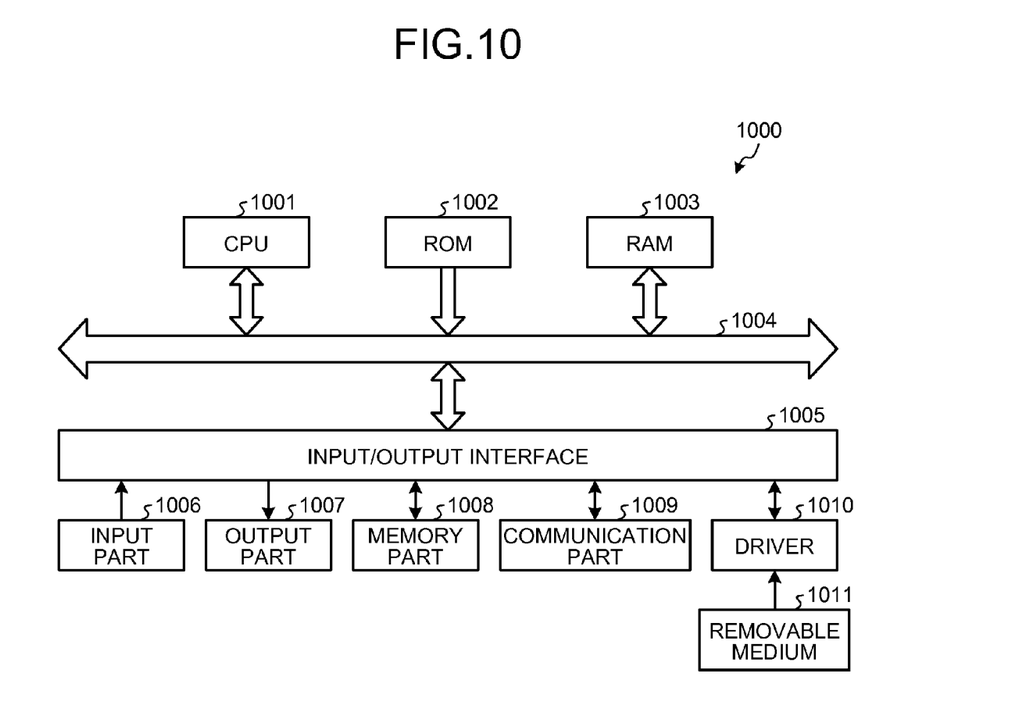
FIG. 10 is an exemplary block diagram illustrating the structure of a computer capable of realizing the embodiments/examples of the disclosure.

In FIG. 10, a central processing unit (CPU) 1001 executes various processing according to the program stored in a read-only memory (ROM) 1002 or a program loaded to a random access memory (RAM) 1003 from a memory part 1008. The data needed for the various processing of the CPU 1001 may be stored in the RAM 1003 as needed. The CPU 1001, the ROM 1002 and the RAM 1003 are connected with each other via a bus 1004. An input/output 1005 is connected with the bus 1004 as well.

The following components are linked with the input/output 1005: an input part 1006 (including keyboard, mouse and the like), an output part 1007 (including displays such as cathode ray tube (CRT), liquid crystal display (LCD) and loudspeaker), the memory part 1008 (including hard disk) and a communication part 1009 (including a network interface card such as LAN card and modem). The communication part 1009 realizes a communication via a network such as the Internet. If needed, a driver 1010 may also be connected with the input/output interface 1005, and a removable medium 1011 such as a magnetic disc, an optical disc, a magnetic optical disc, a semiconductor memory and the like may be installed on the driver 1010 so as to read a computer program therefrom and install the read computer program in the memory part 1008.

In the case where the series of processing above is achieved through software, a program forming the software are installed from a network such as the Internet or a storage medium such as the removable medium 1011.

It should be appreciated by those skilled in the art that the storage medium is not limited to the removable mediums 1011 shown in FIG. 10 in which programs are stored and which are distributed separated from the apparatus so as to provide the programs for users. Examples of the removable medium 1011 include magnetic disc (including soft disc (trademark)), optical disc (including compact disc read-only memory (CD-ROM) and digital video disk (DVD)), magnetic optical disc (including mini disc (MD)(trademark)), and semiconductor memory. Or the storage medium may be the hard discs included in the ROM 1002 and the memory part 1008 in which programs are stored and which are distributed to users along with the devices containing them.

The disclosure further provides a program product stored with computer-readable instruction codes, which, when read and executed by a computer, are capable of realizing the above-described methods provided in the embodiments of the disclosure.

Accordingly, a storage medium for bearing the program product stored with computer-readable instruction codes is also included in the disclosure of the disclosure, the storage medium including, not in a limited way, soft disc, optical disc, magnetic optical disc, memory card, memory stick and the like.

In the foregoing description on the specific embodiments of the disclosure, the feature described and/or shown for an implementation mode may be used in one or more other implementation modes in the same or like way or combined with the features of the other implementation modes, or replace the features of the other implementation modes.

It should be emphasized that the terms 'comprise/include', as used herein, means the existence of a feature, element, step or component in a way not exclusive of the existence or addition of one or more other features, elements, steps or components.

In the above-described embodiments and examples, each step or unit is represented with a reference sign consisting of figures. it should be understood by those of ordinary skill of the art that the reference signs are merely intended to facilitate description and drawing but are not to be construed as a limitation on an order or any other aspect.

Furthermore, the method provided in this disclosure is not limited to be performed in accordance with the time sequence described herein and may be performed sequentially, synchronously or independently in accordance with another time sequence. Therefore, the implementation order of the method described herein is not to be construed as a limitation to the scope of the disclosure.

Although the invention has been disclosed with reference to the description on the specific embodiments of the disclosure, it should be appreciated that the above-described embodiments and examples are illustrative of the invention and are not to be construed as limiting the invention, various modification, improvements or equivalents can be devised by those skilled in the art without departing from the spirit and scope of the principles of the invention, and such modification, improvements or equivalents should be considered to be within the scope of the disclosure.

What is claimed is:

1. An image processing apparatus, capable of stitching two overlapped input images having an overlapped area into an output image, comprising:
    a first registration device configured to perform, by taking a first input image of the two overlapped input images as a reference image, a first registration on a second input image of the two overlapped input images, to find, in the second input image, a second pixel which is matched with each first pixel located in the overlapped area of the reference image;
    an output pixel location determination device configured to calculate, based on the locations of the first and second pixels, a location of an output pixel which is located in the overlapped area of the output image and corresponds to the first pixel, wherein the locations of the first and second pixels are respectively weighted, and the shorter the distance from the first pixel to a non-overlapped area of the reference image is, the greater a weight of the location of the first pixel is, and the smaller a weight of the location of the second pixel is; and
    an output pixel value determination device configured to calculate a pixel value of the output pixel according to a pixel value of at least one of the first and second pixels.

2. The image processing apparatus according to claim 1, wherein the weight of the location of the first pixel is in a nonlinear function relation with the distance from the first pixel to the non-overlapped area of the reference image.

3. The image processing apparatus according to claim 2, wherein the shorter the distance from the first pixel to the non-overlapped area of the reference image or the non-overlapped area of the second input image is, the smaller a variation gradient of the weights is.

4. The image processing apparatus according to claim 3, wherein the output pixel location determination device is further configured to calculate the weight $b(\vec{X})$ of the location of the second pixel according to the following formula or a mathematical transformation based on the following formula and take $(1-b(\vec{X}))$ as the weight of the location of the first pixel:

$$b(\vec{X}) = a \cdot \left\{ 1 - \cos\left[ \frac{dR(\vec{X}) \cdot \pi}{dR(\vec{X}) + dF(\vec{X})} \right] \right\}$$

wherein $\vec{X}$ represents the location of the first pixel, α represents a constant, $dR(\vec{X})$ represents the distance from the first pixel to the non-overlapped area of the reference image, and $dF(\vec{X})$ represents the distance from the first pixel to the non-overlapped area of the second input image.

5. The image processing apparatus according to claim 1, wherein the output pixel value determination device is configured to calculate a weighted sum of the pixel values of the first and second pixels, as the pixel value of the output pixel, wherein the shorter the distance from the output pixel to the non-overlapped area of the reference image is, the greater the weight of the pixel value of the first pixel is, and the shorter the distance from the output pixel to the non-overlapped area of the second input image is, the greater the weight of the pixel value of the second pixel is.

6. The image processing apparatus according to claim 5, wherein the weights of the pixel values of the first and second pixels are in a nonlinear function relation with the distance from the output pixel to the non-overlapped area of the reference image, and the shorter the distance from the output pixel to the non-overlapped area of the reference image or the non-overlapped area of the second input image is, the smaller a variation gradient of the weights is.

7. The image processing apparatus according to claim 6, wherein the output pixel value determination device is further configured to calculate the weight $b(\vec{Y})$ of the pixel value of the second pixel according to the following formula or a mathematical transformation based on the following formula and take $(1-b(\vec{Y}))$ as the weight of the pixel value of the first pixel:

$$b(\vec{Y}) = b \cdot \left\{ 1 - \cos\left[ \frac{dR(\vec{Y}) \cdot \pi}{dR(\vec{Y}) + dF(\vec{Y})} \right] \right\}$$

wherein b represents a constant, $dR(\vec{Y})$ represents the distance from an output pixel at location $\vec{Y}$ to the non-overlapped area of the reference image, and $dF(\vec{Y})$ represents the distance from the output pixel at the location $\vec{Y}$ to the non-overlapped area of the second input image.

8. The image processing apparatus according to claim 1, wherein the first registration device is configured to perform the first registration by using a non-rigid registration method.

9. The image processing apparatus according to claim 1, further comprising:
a rigid registration device configured to perform a rigid registration on the second input image by taking the reference image as a reference before the first registration is performed by the first registration device and outputting the second input image subjected to the rigid registration to the first registration device, wherein the first registration device performs the first registration on the second input image subjected to the rigid registration by taking the reference image as a reference.

10. An image processing method, for stitching two overlapped input images having an overlapped area into an output image, comprising:
configuring and operating a digital image processing apparatus to effect the following steps:
performing, by taking a first input image of the two overlapped input images as a reference image, a first registration on a second input image of the two overlapped input images, to find, in the second input image, a second pixel which is matched with each first pixel located in the overlapped area of the reference image;
calculating, based on the locations of the first and second pixels, a location of an output pixel which is located in the overlapped area of the output image and corresponds to the first pixel, wherein the locations of the first and second pixels are respectively weighted, and the shorter the distance from the first pixel to a non-overlapped area of the reference image is, the greater a weight of the location of the first pixel is, and the smaller a weight of the location of the second pixel is; and
calculating a pixel value of the output pixel according to a pixel value of at least one of the first and second pixels.

11. The image processing method according to claim 10, wherein the weight of the location of the first pixel is in a nonlinear function relation with the distance from the first pixel to the non-overlapped area of the reference image.

* * * * *